(12) United States Patent
Yasuda et al.

(10) Patent No.: US 11,306,167 B2
(45) Date of Patent: Apr. 19, 2022

(54) FLUORINATED ELASTIC COPOLYMER, AND METHOD FOR PRODUCING FLUORINATED ELASTIC COPOLYMER

(71) Applicant: AGC Inc., Chiyoda-ku (JP)

(72) Inventors: Satoko Yasuda, Chiyoda-ku (JP); Keisuke Yagi, Chiyoda-ku (JP); Takehiro Kose, Chiyoda-ku (JP); Yukiko Hattori, Chiyoda-ku (JP); Toshikazu Yoneda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/861,276

(22) Filed: Apr. 29, 2020

(65) Prior Publication Data

US 2020/0255567 A1 Aug. 13, 2020

Related U.S. Application Data

(63) Continuation of application No. PCT/JP2018/044285, filed on Nov. 30, 2018.

(30) Foreign Application Priority Data

Dec. 6, 2017 (JP) ............................. JP2017-234569

(51) Int. Cl.
| | | |
|---|---|---|
| C08F 214/26 | (2006.01) | |
| C08F 214/22 | (2006.01) | |
| C08F 214/28 | (2006.01) | |
| C08F 220/06 | (2006.01) | |
| C08F 283/00 | (2006.01) | |

(52) U.S. Cl.
CPC .......... C08F 214/28 (2013.01); C08F 214/22 (2013.01); C08F 214/26 (2013.01); C08F 220/06 (2013.01); C08F 283/00 (2013.01); *C08F 214/222* (2013.01); *C08F 214/262* (2013.01); *C08F 214/282* (2013.01)

(58) Field of Classification Search
CPC .......... C08F 214/26; C08F 214/262; C08F 214/265; C08F 214/22; C08F 214/225; C08F 214/28; C08F 214/285
See application file for complete search history.

(56) References Cited

U.S. PATENT DOCUMENTS

| | | | | |
|---|---|---|---|---|
| 4,151,342 A | | 4/1979 | Uchino et al. | |
| 4,158,678 A | * | 6/1979 | Tatemoto | ............ C08F 293/005 522/135 |
| 4,361,678 A | * | 11/1982 | Tatemoto | .............. C08F 214/22 525/350 |
| 4,948,853 A | * | 8/1990 | Logothetis | .......... C08F 214/262 526/206 |
| 4,983,697 A | * | 1/1991 | Logothetis | .......... C08F 214/262 526/206 |
| 5,037,921 A | * | 8/1991 | Carlson | ..................... C08K 7/14 526/247 |
| 5,102,965 A | * | 4/1992 | Carlson | ................. C08F 210/06 526/206 |
| 5,670,593 A | * | 9/1997 | Araki | ....................... C08L 67/00 526/245 |
| 5,717,036 A | * | 2/1998 | Saito | .................... C08F 214/222 525/326.3 |
| 6,140,437 A | * | 10/2000 | Kitaichi | .............. C08F 214/262 526/247 |
| 6,326,436 B2 | * | 12/2001 | Bowers | ............... C08F 214/222 525/248 |
| 6,646,077 B1 | * | 11/2003 | Lyons | ................... C08F 214/22 526/206 |
| 6,864,336 B2 | * | 3/2005 | Kaspar | ...................... C08F 8/30 526/255 |
| 7,220,807 B2 | * | 5/2007 | Chung | ..................... C08F 4/52 526/197 |
| 7,375,171 B2 | * | 5/2008 | Nishimura | ............ C08F 214/18 524/345 |

(Continued)

FOREIGN PATENT DOCUMENTS

| | | |
|---|---|---|
| JP | 08-012838 A | 1/1996 |
| JP | 5321580 B2 | 10/2013 |
| WO | WO 2010/053056 A1 | 5/2010 |

OTHER PUBLICATIONS

International Search Report dated Feb. 5, 2019 in PCT/JP2018/044285 filed on Nov. 30, 2018, 2 pages.

*Primary Examiner* — Rip A Lee
(74) *Attorney, Agent, or Firm* — Oblon, McClelland, Maier & Neustadt, L.L.P.

(57) ABSTRACT

To provide a fluorinated elastic copolymer excellent in adhesion, processability, mechanical properties, heat resistance and chemical resistance.

A fluorinated elastic copolymer having units based on a monomer (a), units based on a monomer (b) and optionally units based on a monomer (c), which has an iodine atom bonded to a terminal of a molecular chain and the unit based on the monomer (b) adjacent to the iodine atom, and which has a proportion of the units based on the monomer (b) of from 0.09 to 2.0 mol % to all units. Monomer (a): monomer selected from the group consisting of tetrafluoroethylene, hexafluoropropylene, vinylidene fluoride, chlorotrifluoroethylene, a perfluoro(alkyl vinyl ether) and 2,3,3,3-tetrafluoropropene; monomer (b): a monomer having at least one type of functional group selected from the group consisting of an epoxy group, a hydroxy group, a carbonyl group-containing group and an isocyanate group; monomer (c): a monomer selected from the group consisting of ethylene and propylene.

11 Claims, No Drawings

(56) References Cited

U.S. PATENT DOCUMENTS

| | | | | |
|---|---|---|---|---|
| 8,835,551 | B2* | 9/2014 | Fukushi | C08F 14/16 |
| | | | | 524/546 |
| 9,156,926 | B2* | 10/2015 | Lochhaas | C08F 214/262 |
| 9,982,091 | B2* | 5/2018 | Hintzer | C08K 5/06 |
| 10,787,531 | B2* | 9/2020 | Yagi | C08F 210/06 |
| 10,875,948 | B2* | 12/2020 | Jochum | C08F 259/08 |
| 2007/0100062 | A1* | 5/2007 | Lyons | C08F 214/18 |
| | | | | 524/544 |
| 2011/0207889 | A1* | 8/2011 | Kose | C08J 3/24 |
| | | | | 525/326.3 |
| 2016/0369021 | A1* | 12/2016 | Manzoni | C08K 5/14 |
| 2018/0305483 | A1* | 10/2018 | Lannuzel | C08F 8/04 |
| 2019/0161607 | A1* | 5/2019 | Fantoni | C08F 214/242 |

* cited by examiner

FLUORINATED ELASTIC COPOLYMER, AND METHOD FOR PRODUCING FLUORINATED ELASTIC COPOLYMER

TECHNICAL FIELD

The present invention relates to a fluorinated elastic copolymer, and a method for producing a fluorinated elastic copolymer.

BACKGROUND ART

A fluorinated elastic copolymer, which is excellent in heat resistance, chemical resistance, oil resistance, weather resistance, etc., is applicable to use in a severe environment, in which a conventional hydrocarbon material cannot withstand.

As a technique relating to a fluorinated elastic copolymer and its production method, for example, techniques as described in Patent Documents 1 and 2 are known.

Patent Document 1 discloses a method for producing a fluorinated elastic copolymer, which comprises copolymerizing tetrafluoroethylene, propylene and as the case requires, a perfluoro(alkyl vinyl ether) in the presence of a radical polymerization initiator and an iodine compound represented by RI2 (wherein R is an alkylene group or a perfluoroalkylene group having at least 3 carbon atoms) at a polymerization temperature of from 0 to 50° C.

Patent Document 2 discloses a method for producing a fluorinated thermoplastic elastomer, which comprises kneading a polymer (A) having a functional group (X), having a glass transition temperature of at most 10° C. and having a fluorine content of at least 40 wt %, and a polymer (B) having a functional group (Y) reactive with the functional group (X), having a melting temperature of at least 150° C. and having a fluorine content of at least 40 wt % in a molten state so that the functional group (X) and the functional group (Y) are reacted with each other.

PRIOR ART DOCUMENTS

Patent Documents

Patent Document 1: Japanese Patent No. 5321580
Patent Document 2: JP-A-H8-12838

DISCLOSURE OF INVENTION

Technical Problem

However, the fluorinated elastic copolymer disclosed in Patent Document 1 can hardly be formed into a laminate or a composite as attached to another material, and it is desired to have adhesion imparted.

On the other hand, in [Reference Example 2] in Patent Document 2, 60 g of perfluoro(propyl vinyl ether), 9.3 g of I(CF2)$_4$I, 7 g of tetrafluoroethylene and 0.1 g of K$_2$S$_2$O$_8$ are charged and heated to 50° C. to initiate polymerization, to obtain 176 g of a copolymer having a polymer unit composition of tetrafluoroethylene/perfluoro(propyl vinyl ether) of 60/40 (molar ratio), and 80 g of the obtained copolymer, 16 g of allyl glycidyl ether, 5 g of t-butyl peroxyisobutyrate and 1 kg of trichlorotrifluoroethane were charged and reacted at 60° C. for 5 hours to obtain copolymer (IV). The mass average molecular weight of the copolymer (IV) as calculated from the above description is so low as about 50. Accordingly, the copolymer (IV) tends to have low processability and mechanical properties.

Since the glycidyl group content of the copolymer (IV) is $2 \times 10^{-4}$ equivalent/g, the glycidyl group content is so high as about 3.2 mol %, as determined based on the calculated mass average molecular weight of the copolymer (IV) of 50. Accordingly, the copolymer (IV) may have low processability, heat resistance or chemical resistance.

The object of the present invention is to provide a fluorinated elastic copolymer excellent in adhesion, processability, mechanical properties, heat resistance and chemical resistance, and a method for producing a fluorinated elastic copolymer excellent in adhesion, processability, mechanical properties, heat resistance and chemical resistance.

Solution to Problem

The present invention has the following constitutions.

[1] A fluorinated elastic copolymer having units based on the following monomer (a), units based on the following monomer (b) and optionally units based on the following monomer (c),
which has an iodine atom bonded to a terminal of a molecular chain of the fluorinated elastic copolymer, and the unit based on the monomer (b) adjacent to the iodine atom, and
which has a proportion of the units based on the monomer (b) of from 0.09 to 2.0 mol % to all units of the fluorinated elastic copolymer:
monomer (a): a monomer selected from the group consisting of tetrafluoroethylene, hexafluoropropylene, vinylidene fluoride, chlorotrifluoroethylene, a perfluoro(alkyl vinyl ether) and 2,3,3,3-tetrafluoropropene,
monomer (b): a monomer having at least one type of functional group selected from the group consisting of an epoxy group, a hydroxy group, a carbonyl group-containing group and an isocyanate group;
monomer (c): a monomer selected from the group consisting of ethylene and propylene.

[2] The fluorinated elastic copolymer according to [1], which is a copolymer selected from the group consisting of a copolymer having units based on tetrafluoroethylene, units based on propylene and units based on the monomer (b), a copolymer having units based on tetrafluoroethylene, units based on a perfluoro(alkyl vinyl ether) and units based on the monomer (b), a copolymer having units based on vinylidene fluoride, units based on hexafluoropropylene and units based on the monomer (b), a copolymer having units based on tetrafluoroethylene, units based on vinylidene fluoride, units based on hexafluoropropylene and units based on the monomer (b), and a copolymer having units based on vinylidene fluoride, units based on tetrafluoroethylene, units based on a perfluoro(alkyl vinyl ether) and units based on the monomer (b).

[3] The fluorinated elastic copolymer according to [1] or [2], wherein the monomer (b) is a monomer selected from the group consisting of allyl glycidyl ether, vinyl glycidyl ether, 4-glycidyl oxybutyl vinyl ether and 4-hydroxybutyl vinyl ether.

[4] The fluorinated elastic copolymer according to any one of [1] to [3], wherein the proportion of the units based on the monomer (a) is from 30 to 98 mol % to the total amount of all units of the fluorinated elastic copolymer.

[5] The fluorinated elastic copolymer according to any one of [1] to [4], which has the units based on the monomer (c).

[6] The fluorinated elastic copolymer according to [5], wherein the total proportion of the units based on the monomer (a) and the units based on the monomer (c) is from 50 to 99.91 mol % to the total amount of all units of the fluorinated elastic copolymer.

[7] The fluorinated elastic copolymer according to [5] or [6], wherein the proportion of the units based on the monomer (c) is from 1 to 70 mol % to the total amount of the units based on the monomer (a) and the units based on the monomer (c).

[8] The fluorinated elastic copolymer according to any one of [1] to [7], which has a mass average molecular weight of from 10,000 to 2,000,000.

[9] A method for producing a fluorinated elastic copolymer having units based on the following monomer (a), units based on the following monomer (b) and optionally units based on the following monomer (c), which comprises polymerizing a monomer component comprising the monomer (a) and optionally the monomer (c) and not including the monomer (b), in the presence of an iodine compound having two iodine atoms until units in an amount of at least 80 mol % to all units of the fluorinated elastic copolymer are formed, and copolymerizing monomer components comprising the monomer (a), the monomer (b) and optionally the monomer (c) until the units based on the monomer (b) in an amount of from 0.09 to 2.0 mol % to all units of the fluorinated elastic copolymer are formed:

monomer (a): a monomer selected from the group consisting of tetrafluoroethylene, hexafluoropropylene, vinylidene fluoride, chlorotrifluoroethylene, a perfluoro(alkyl vinyl ether) and 2,3,3,3-tetrafluoropropene;

monomer (b): a monomer having at least one type of functional group selected from the group consisting of an epoxy group, a hydroxy group, a carbonyl group-containing group and an isocyanate group;

monomer (c): a monomer selected from the group consisting of ethylene and propylene.

[10] The production method according to [9], wherein the iodine compound is a compound represented by the following formula (1):

$$I-R^{f1}-I \quad (1)$$

wherein $R^{f1}$ is a $C_{4-12}$ perfluoroalkylene group.

[11] The production method according to [9] or [10], wherein the monomer (a) and optionally the monomer (c) are polymerized in the presence of an emulsifier.

Advantageous Effects of Invention

According to the present invention, it is possible to obtain a fluorinated elastic copolymer excellent in adhesion, processability, mechanical properties, heat resistance and chemical resistance.

DESCRIPTION OF EMBODIMENTS

Meanings of the following terms in this specification are as follows.

A "monomer" means a compound having a polymerizable unsaturated bond.

The polymerizable unsaturated bond may, for example, be a double bond or a triple bond between carbon atoms.

"Units based on a monomer" generally means an atomic group directly formed by polymerization of one monomer molecule, and an atomic group obtained by chemical conversion of a part of the atomic group. The units based on a monomer may be referred to also as "monomer units".

The "terminal of a molecular chain" means both the terminal of the main chain and the terminal of each branched chain.

The "carbonyl group-containing group" means a group having a carbonyl group (—C(=O)—) in its structure.

<Fluorinated Elastic Copolymer>

The fluorinated elastic copolymer of the present invention has units based on a monomer (a) (hereinafter referred to as units (a)), units based on a monomer (b) (hereinafter referred to as units (b)) and optionally units based on a monomer (c) (hereinafter referred to as units (c)). The fluorinated elastic copolymer may further have units based on a monomer other than the monomer (a), the monomer (b) and the monomer (c) (hereinafter referred to as monomer (d)) (hereinafter referred to as units (d)), within a range not to impair the effects of the present invention.

Further, the fluorinated elastic copolymer of the present invention has no melting point.

The monomer (a) is a monomer selected from the group consisting of tetrafluoroethylene (hereinafter referred to as TFE), hexafluoropropylene (hereinafter referred to as HFP), vinylidene fluoride (hereinafter referred to as VdF), chlorotrifluoroethylene, a perfluoro(alkyl vinyl ether) (hereinafter referred to as PAVE) and 2,3,3,3-tetrafluoropropene.

PAVE is preferably compound represented by the formula (2):

$$CF_2=CF-O-R^{f2} \quad (2)$$

wherein $R^{f2}$ is a $C_{1-8}$ perfluoroalkyl group or a $C_{1-8}$ perfluoroalkyl group having an etheric oxygen atom.

The number of carbon atoms in the perfluoroalkyl group as $R^{f2}$ is preferably from 1 to 6, more preferably from 1 to 5.

As specific examples of PAVE, perfluoro(methyl vinyl ether), perfluoro(ethyl vinyl ether), perfluoro(propyl vinyl ether), perfluoro(3,6-dioxa-1-heptene), perfluoro(3,6-dioxa-1-octene) and perfluoro(5-methyl-3,6-dioxa-1-nonene) may be mentioned.

The monomer (a) is preferably TFE.

The monomer (a) may be used in combination of two or more.

The monomer (b) is a monomer having at least one type of functional group selected from the group consisting of an epoxy group, a hydroxy group, a carbonyl group-containing group and an isocyanate group (hereinafter sometimes referred to as "adhesive functional group").

The number of the adhesive functional group which the monomer (b) has may be one or two or more. In a case where the monomer (b) has two or more adhesive functional groups, the two or more adhesive functional groups may be the same or different.

The monomer (b) is preferably a compound having one adhesive functional group and having one polymerizable carbon-carbon double bond.

The monomer (b) having an epoxy group may, for example, be unsaturated glycidyl ether, unsaturated glycidyl ester, 2-[2-(3-butenyl)ethyl]oxirane, 2-[3-(2-butenyl)propyl]oxirane or 2-[4-(2-butenyl)butyl]oxirane.

The unsaturated glycidyl ether may, for example, be allyl glycidyl ether (hereinafter referred to as AGE), 2-methyl allyl glycidyl ether, vinyl glycidyl ether or 4-glycidyl oxybutyl vinyl ether (hereinafter referred to as GO-BVE).

The unsaturated glycidyl ester may, for example, be glycidyl acrylate or glycidyl methacrylate.

The monomer (b) having a hydroxy group may, for example, be, a hydroxy group-containing vinyl ether, a hydroxy group-containing vinyl ester, a hydroxy group-containing allyl ether, a hydroxy group-containing (meth)acrylate, hydroxyethyl crotonate or allyl alcohol.

The hydroxy group-containing vinyl ether may, for example, be 2-hydroxyethyl vinyl ether, 4-hydroxybutyl vinyl ether (hereinafter referred to as HBVE), cyclohexane dimethanol monovinyl ether or diethylene glycol monovinyl ether.

The hydroxy group-containing allyl ether may, for example, be 3-allyloxy-1,2-propanediol, 5-(2-propenyloxy)-1-pentanol, 6-(2-propenyloxy)-1-hexanol, 2-(2-propenyloxy)-1,4-butanediol or 4-(2-propenyloxy)-1,2-butanediol.

The carbonyl group-containing group may, for example, be a group having a carbonyl group between carbon atoms of a hydrocarbon group, a carbonate group, a carboxy group, a haloformyl group, an alkoxycarbonyl group, an acid anhydride residue or a polyfluoroalkoxycarbonyl group.

The hydrocarbon group in the group having a carbonyl group between carbon atoms of a hydrocarbon group may, for example, be a $C_{2-8}$ alkylene group. The number of carbon atoms in the alkylene group is the number of carbon atoms not including carbon atoms constituting the carbonyl group. The alkylene group may be linear or branched.

The haloformyl group is represented by —C(=O)—$X^1$ (wherein $X^1$ is a halogen atom). The halogen atom in the haloformyl group may, for example, be a fluorine atom or a chlorine atom, and is preferably a fluorine atom.

The alkoxy group in the alkoxycarbonyl group may be linear or branched, and is preferably a $C_{1-8}$ alkoxy group, more preferably a methoxy group or an ethoxy group.

The monomer (b) having a carbonyl group-containing group may, for example, be an acid anhydride residue-containing cyclic monomer, a carboxy group-containing monomer, a vinyl ester, a (meth)acrylate or a compound represented by the formula (3):

$$CF_2=CFOR^{f3}CO_2X^2 \quad (3)$$

wherein $R^{f3}$ is a $C_{1-10}$ perfluoroalkylene group or a $C_{2-10}$ perfluoroalkylene group having an etheric oxygen atom, and $X^2$ is a hydrogen atom or a $C_{1-3}$ alkyl group.

The acid anhydride residue-containing cyclic monomer may, for example, be an unsaturated dicarboxylic acid anhydride (such as itaconic anhydride, citraconic anhydride, 5-norbornene-2,3-dicarboxylic anhydride or maleic anhydride).

The carboxy group-containing monomer may, for example, be an unsaturated dicarboxylic acid (such as itaconic acid, citraconic acid, 5-norbornene-2,3-dicarboxylic acid or maleic acid) or an unsaturated monocarboxylic acid (such as acrylic acid or methacrylic acid).

The (meth)acrylate may, for example, be a (polyfluoroalkyl) acrylate or a (polyfluoroalkyl) methacrylate.

The monomer (b) having an isocyanate group may, for example, be 2-(meth)acryloyloxyethyl isocyanate, 2-(2-(meth)acryloyloxyethoxy)ethyl isocyanate or 1,1-bis((meth)acryloyloxymethyl)ethyl isocyanate.

The monomer (b) is, in that the fluorinated elastic copolymer will be more excellent in adhesion, preferably an epoxy group-containing monomer or a hydroxy group-containing monomer, more preferably AGE, vinyl glycidyl ether, GO-BVE or HBVE, particularly preferably AGE or HBVE.

The monomer (b) may be used in combination of two or more.

The monomer (c) is a monomer selected from the group consisting of ethylene and propylene. The monomer (c) is preferably propylene. The monomer (c) may be used in combination of two or more.

The monomer (d) may, for example, be a monomer having a fluorine atom such as fluoroethylene, trifluoroethylene, dichlorodifluoroethylene, trifluoropropylene, pentafluoropropylene, hexafluoroisobutene, perfluorocyclobutene, a (perfluoroalkyl)ethylene such as $CH_2=CHCF_2CF_3$, $CH_2=CHCF_2CF_2CF_3$, $CH_2=CHCF_2CF_2CF_2CF_3$ or $CH_2=CHCF_2CF_2CF_2CF_2CF_3$, or a perfluorodivinyl ether such as $CF_2=CFOCF_2CF_2CF=CF_2$, $CF_2=CFOCF_2CF_2CF_2OCF=CF_2$ or $CF_2=CFOCF_2CF_2CF_2CF_2OCF=CF_2$, an α-olefin such as 1-butene, isobutylene or 1-pentene, a vinyl ether such as methyl vinyl ether, ethyl vinyl ether, propyl vinyl ether, butyl vinyl ether or cyclohexyl vinyl ether, a vinyl ester such as vinyl acetate, vinyl propionate, vinyl butyrate, vinyl caproate, vinyl caprylate, vinyl crotonate, vinyl benzoate or vinyl chloroacetate, vinyl chloride, vinylidene chloride or trifluorostyrene.

The monomer (d) may be used in combination of two or more.

As the monomer (d), a monomer having an iodine atom may be used. By copolymerizing a monomer having an iodine atom, iodine atoms can be introduced to side chains of the fluorinated elastic copolymer.

The monomer having an iodine atom may, for example, be iodoethylene, 4-iodo-3,3,4,4-tetrafluoro-1-butene, 2-iodo-1,1,2,2-tetrafluoro-1-vinyloxyethane, 2-iodoethyl vinyl ether, allyl iodide, 1,1,2,3,3,3-hexafluoro-2-iodo-1-(perfluorovinyloxy)propane, 3,3,4,5,5,5-hexafluoro-4-iodopentene, iodotrifluoroethylene or 2-iodoperfluoro(ethyl vinyl ether).

In the fluorinated elastic copolymer, the proportion of the units (a) is preferably from 30 to 98 mol %, more preferably from 30 to 70 mol %, further preferably from 45 to 65 mol %, particularly preferably from 50 to 60 mol % to the total amount of all units of the fluorinated elastic copolymer. When the proportion of the units (a) is at least 30 mol %, the fluorinated elastic copolymer will be more excellent in heat resistance and chemical resistance. When the proportion of the units (a) is at most 98 mol %, the fluorinated elastic copolymer will be more excellent in processability and adhesion.

In the fluorinated elastic copolymer, the proportion of the units (b) is from 0.09 to 2.0 mol %, preferably from 0.1 to 1.5 mol %, more preferably from 0.15 to 1.0 mol %, particularly preferably from 0.2 to 0.8 mol %, to the total amount of all units of the fluorinated elastic copolymer. When the proportion of the units (b) is at least 0.09 mol %, the fluorinated elastic copolymer will be excellent in adhesion. When the proportion of the units (b) is at most 2.0 mol %, the fluorinated elastic copolymer will be excellent in heat resistance and chemical resistance.

In a case where the fluorinated elastic copolymer has the units (c), the total proportion of the units (a) and the units (c) is preferably from 50 to 99.91 mol %, more preferably from 60 to 99.9 mol %, further preferably from 65 to 99.85 mol %, particularly preferably from 70 to 99.8 mol %, to the total amount of all units of the fluorinated elastic copolymer. When the total proportion of the units (a) and the units (c) is within such a range, the fluorinated elastic copolymer will be excellent in processability, adhesion and heat resistance.

In a case where the fluorinated elastic copolymer has the units (c), the proportion of the units (c) is preferably from 1 to 70 mol %, more preferably from 30 to 70 mol %, further preferably from 40 to 60 mol % to the total amount of the units (a) and the units (c). In such a case, when the proportion of the units (c) is within a range of from 1 to 70 mol %, the fluorinated elastic copolymer will be more excellent in processability and mechanical properties, and its crosslinked product will be more excellent in rubber properties.

In a case where the fluorinated elastic copolymer has the units (d), the proportion of the units (d) is preferably from 0.001 to 2.0 mol %, more preferably from 0.01 to 1.5 mol %, further preferably from 0.01 to 1.0 mol % to the total amount of all units of the fluorinated elastic copolymer.

The fluorinated elastic copolymer is, in that the productivity will be more excellent, and the obtainable crosslinked product will be more excellent in mechanical properties, heat resistance, chemical resistance, oil resistance and processability, preferably a copolymer selected from the group consisting of the following copolymers (X1) to (X5), more preferably the copolymer (X1), the copolymer (X3) and the copolymer (X4), further preferably the copolymer (X1).

Copolymer (X1): a copolymer having TFE units, propylene units (hereinafter referred to as P units) and the units (b).

Copolymer (X2): a copolymer having TFE units, PAVE units and the units (b).

Copolymer (X3): a copolymer having VdF units, HFP units and the units (b).

Copolymer (X4): a copolymer having TFE units, VdF units, HFP units and the units (b).

Copolymer (X5): a copolymer having VdF units, TFE units, PAVE units and the units (b).

The molar ratios or the proportions of the units other than the units (b) constituting the copolymers (X1) to (X5) are preferably within the following ranges, in that the obtainable crosslinked product will be more excellent in mechanical properties, heat resistance, chemical resistance, oil resistance and weather resistance.

Copolymer (X1): TFE units/P units=40/60 to 60/40 (molar ratio).

Copolymer (X2): TFE units/PAVE units=55/45 to 75/25 (molar ratio).

Copolymer (X3): VdF units/HFP units=70/20 to 85/15 (molar ratio).

Copolymer (X4): the proportion of the TFE units is from 15 to 30 mol %, the proportion of the VdF units is from 45 to 60 mol %, and the proportion of the HFP units is from 15 to 30 mol %, to the total amount of all units constituting the copolymer (X4).

Copolymer (X5): the proportion of the VdF units is from 65 to 80 mol %, the proportion of the TFE units is from 4 to 12 mol %, and the proportion of the PAVE units is from 10 to 25 mol %, to the total amount of all units constituting the copolymer (X5).

The fluorinated elastic copolymer has an iodine atom bonded to a terminal of a molecular chain, whereby the fluorinated elastic copolymer is excellent in crosslinkability.

The fluorinated elastic copolymer has the unit (b) adjacent to the iodine atom bonded to the terminal of the molecular chain. That is, the fluorinated elastic copolymer of the present invention has at least one unit (b) at each terminal of the molecular chain, and has an iodine atom bonded to the unit (b) present at each terminal of the molecular chain, whereby the fluorinated elastic copolymer is excellent in adhesion.

The fluorinated elastic copolymer having an iodine atom at the terminal of the molecular chain and having the unit (b) adjacent to the iodine atom can be confirmed in such a manner that the fluorinated elastic copolymer is heat-decomposed at 600° C. by means of Double-Shot Pyrolyzer (PY-2020iD, manufactured by Frontier Laboratories Ltd.), followed by analysis by means of EI+ ionization method by gas chromatography/Time of Flight Mass spectrometer (hereinafter referred to as GC/TOFMS) (7890A, manufactured by Agilent, and JMS-T100GC, manufactured by JEOL Ltd.).

The fluorinated elastic copolymer preferably has the units (b) in a region within 10 mol % to all units of the molecular chain from each terminal of the molecular chain. The region in which the units (b) are present, in the fluorinated elastic copolymer, is more preferably a region within 8 mol % to all units of the molecular chain from each terminal of the molecular chain, more preferably a region within 5 mol %. When the fluorinated elastic copolymer has the units (b) in a region within 10 mol % to all units of the molecular chain from each terminal, the fluorinated elastic copolymer will be excellent in adhesion. As a method of introducing the units (b) to the region within 10 mol % from each terminal of the molecular chain, for example, the after-described method for producing the fluorinated elastic copolymer of the present invention may be applicable.

The fluorinated elastic copolymer more preferably has the units (b) only in a region within 10 mol % to all units of the molecular chain from each terminal of the molecular chain. In the fluorinated elastic copolymer, the region in which the units (b) are present is more preferably a region within 8 mol % to all units of the molecular chain from each terminal of the molecular chain, further preferably a region within 5 mol %. When the fluorinated elastic copolymer has the units (b) only in a region within 10 mol % to all units of the molecular chain from each terminal, the fluorinated elastic copolymer will be more excellent in adhesion. As a method of introducing the units (b) only in a region within 10 mol % from each terminal of the molecular chain, for example, the after-described method for producing the fluorinated elastic copolymer of the present invention may be applicable.

For example, introduction of an iodine atom bonded to both terminals of the molecular chain and the adjacent unit (b) is confirmed by a spectrum corresponding to a molecule having an iodine atom bonded to both terminals of the molecular chain and the unit (b) bonded, being detected by pyrolysis gas chromatography mass spectrometry.

The fluorinated elastic copolymer preferably has no units (b) in a region other than the region within 10 mol % to all units of the molecular chain from each terminal of the molecular chain. When the fluorinated elastic copolymer has no units (b) in a region other than the region within 10 mol % to all units of the molecular chain from each terminal of the molecular chain, the molecular chain will not be broken in the middle originating from the moiety of the unit (b), whereby the fluorinated elastic copolymer will be more excellent in heat resistance and chemical resistance.

The number of the units (b) present in a region within 10 mol % to all units of the molecular chain from each terminal of the molecular chain is preferably from 1 to 20, more preferably from 1 to 10, further preferably from 1 to 5. When the number of the units (b) present in a region within 10 mol % from each terminal of the molecular chain is at least 1, the fluorinated elastic copolymer of the present invention will be more excellent in adhesion. When the number of the units (b) present in a region within 10 mol % from each terminal of the molecular chain is at most 20, the fluorinated elastic copolymer of the present invention will be more excellent in heat resistance and chemical resistance.

The fluorinated elastic copolymer preferably contains from 0.01 to 5.0 mass % of iodine atoms, more preferably from 0.1 to 1.0 mass %. When the fluorinated elastic copolymer contains from 0.01 to 5.0 mass % of iodine atoms to 100 mass % of the fluorinated elastic copolymer, the fluorinated elastic copolymer will be more excellent in crosslinkability.

The mass average molecular weight of the fluorinated elastic copolymer is preferably from 10,000 to 2,000,000, more preferably from 100,000 to 1,000,000, further preferably from 100,000 to 500,000. The mass average molecular weight is a value measured as calculated as polystyrene by gel permeation chromatography (GPC).

When the mass average molecular weight is at least 10,000, the fluorinated elastic copolymer will be more excellent in mechanical properties, chemical resistance and heat resistance. When the mass average molecular weight is at most 2,000,000, the fluorinated elastic copolymer will be excellent in flexibility and more excellent in processability.

The elastic shear modulus G' of the fluorinated elastic copolymer is preferably from 10 to 1,000 kPa, more preferably from 50 to 700 kPa, further preferably from 100 to 500 kPa. The elastic shear modulus G' is a value measured in accordance with ASTM D6204 at a temperature of 100° C. at an amplitude of 0.5° at a frequency of 50 cpm. The elastic shear modulus G' is an index of the molecular weight and the flowability, and a high elastic shear modulus G' means a high molecular weight and a low flowability.

When the elastic shear modulus G' is at least 10 kPa, the fluorinated elastic copolymer will be more excellent in adhesion, mechanical properties, chemical resistance and heat resistance. When the elastic shear modulus G' is at most 1,000 kPa, the fluorinated elastic copolymer will be excellent in flowability and more excellent in processability.

The Mooney viscosity of the fluorinated elastic copolymer is preferably from 5 to 200, more preferably from 10 to 170, further preferably from 20 to 100. The Mooney viscosity is a value measured in accordance with JIS K6300 using a L rotor having a diameter of 38.1 mm and a thickness of 5.54 mm at 100° C. for a preheating time of 1 minute for a rotor revolution time of 10 minutes. The Mooney viscosity is an index of the molecular weight, and a high Mooney viscosity indicates a high molecular weight, and a low Mooney viscosity indicates a low molecular weight. When the Mooney viscosity is within a range of from 5 to 200, the fluorinated elastic copolymer will be excellent in the balance between flowability and crosslinkability.

The glass transition temperature of the fluorinated elastic copolymer is preferably from −40 to 20° C., more preferably from −20 to 10° C. When the glass transition temperature is within a range of from −40 to 20° C., the fluorinated elastic copolymer will be more excellent in processability and adhesion.

The density of the fluorinated elastic copolymer is preferably from 1.3 to 2.2 mg/m$^3$, more preferably from 1.4 to 2.0 mg/m$^3$, further preferably from 1.5 to 1.7 mg/m$^3$. When the density is within a range of from 1.3 to 2.2 mg/m$^3$, the fluorinated elastic copolymer will be more excellent in mechanical properties and adhesion.

(Mechanism of Action)

Since the above-described fluorinated elastic copolymer of the present invention has an iodine atom bonded to a terminal of a molecular chain and the unit (b) adjacent thereto, the adhesive functional group is bonded to the vicinity of the terminal of the molecular chain. Further, the proportion of the units (b) is at least 0.09 mol % to all units of the fluorinated elastic copolymer. Accordingly, the fluorinated elastic copolymer of the present invention is excellent in adhesion. Further, in the fluorinated elastic copolymer, the proportion of the units (b) is at most 2.0 mol % to all units, whereby the fluorinated elastic copolymer is excellent in mechanical properties, heat resistance and chemical resistance.

<Method for Producing Fluorinated Elastic Copolymer>

The method for producing the fluorinated elastic copolymer of the present invention is a method for producing a fluorinated elastic copolymer having the units (a), units (b) and optionally units (c). The units (a), the units (b) and the units (c) are the same as described for the fluorinated elastic copolymer of the present invention.

In the method for producing the fluorinated elastic copolymer of the present invention, first, a monomer component comprising the monomer (a) and optionally the monomer (c) and not including the monomer (b) (hereinafter referred to as monomer component (1)) is copolymerized in the presence of an iodine compound having two iodine atoms until units in an amount of at least 80 mol % to all units of the fluorinated elastic copolymer are formed. The monomer component (1) may include the monomer (d) within a range not to impair the effects of the present invention.

By copolymerization in the presence of an iodine compound having two iodine atoms, the molecular weight of the fluorinated elastic copolymer can be properly controlled.

By copolymerizing the monomer component (1) until units in an amount of at least 80 mol % to all units of the fluorinated elastic copolymer are formed, the obtainable fluorinated elastic copolymer will be excellent in heat resistance and chemical resistance.

By copolymerizing the monomer component (1), an intermediate having units in an amount of at least 80 mol % to all units of the fluorinated elastic copolymer is formed.

In formation of the intermediate, units in an amount of at least 90 mol % to all units of the fluorinated elastic copolymer are preferably formed, units in an amount of at least 92 mol % are more preferably formed, and units in an amount of at least 95 mol % are further preferably formed. By copolymerizing the monomer (a) and optionally the monomer (c) until units in an amount of at least 90 mol % to all units of the fluorinated elastic copolymer are formed, the obtainable fluorinated elastic copolymer will be more excellent in heat resistance and chemical resistance.

In formation of the intermediate, it is preferred that units in an amount of at most 99.91 mol % to all units of the fluorinated elastic copolymer are formed, although not particularly limited.

In the method for producing the fluorinated elastic copolymer of the present invention, then, monomer components comprising the monomer (a), the monomer (b) and optionally the monomer (c) (hereinafter referred to as monomer component (2)) are copolymerized until the units (b) in an amount of from 0.09 to 2.0 mol % to all units of the fluorinated elastic copolymer are formed. The monomer component (2) may include the monomer (d) within a range not to impair the effects of the present invention.

When the monomer component (2) is copolymerized, it is preferred that the units (b) in an amount of from 0.1 to 2.0 mol % to all units of the fluorinated elastic copolymer are preferably formed, and the units (b) in an amount of from 0.1 to 1.5 mol % are more preferably formed.

By copolymerizing the monomer component (2) until the units (b) in an amount of at least 0.09 mol % to all units of the fluorinated elastic copolymer are formed, the obtainable fluorinated elastic copolymer will be excellent in adhesion. By copolymerizing the monomer component (2) until the units (b) in an amount of at most 2.0 mol % to all units of the fluorinated elastic copolymer are formed, the obtainable fluorinated elastic copolymer will be excellent in mechanical properties, heat resistance and chemical resistance.

In the method for producing the fluorinated elastic copolymer of the present invention, it is preferred to copolymerize the monomer component (2) in a state where elongation of the intermediate is continued. The influence of such a production method over the structure of the fluorinated elastic copolymer is not necessarily clearly understood, but is considered as follows.

In a part of the intermediate, elongation of the molecular chain is terminated by introduction of the units (b), and in the rest of the intermediate, the units (a) and optionally the units (c) are further introduced, and elongation of the molecular chain is continued, while the units (b) are not introduced. Accordingly, it makes a difference in time over which elongation of the intermediate is continued whether the units (b) are introduced or not, and there is a difference in the molecular weight among the respective molecular chains in the obtained fluorinated elastic copolymer. As a result, the molecular weight distribution of the obtained fluorinated elastic copolymer is broad, and a molecular chain of the fluorinated elastic copolymer having a relatively high molecular weight and a molecular chain of the fluorinated elastic copolymer having a relatively low molecular weight can be produced simultaneously.

It is considered that by the fluorinated elastic copolymer having such a structure, it has excellent properties such as high flowability by the broad molecular weight distribution, and high reactivity of the adhesive functional group introduced to the terminal, while maintaining high heat resistance and chemical resistance.

In the method for producing a fluorinated elastic copolymer of the present invention, first, the monomer component (1) is polymerized in the presence of the iodine compound to prepare the intermediate. Then, the monomer component (2) is copolymerized. In such a manner, it is possible to produce a fluorinated elastic copolymer having the units (b) only in a region within 10 mol % to all units of the molecular chain from each terminal of the molecular chain and having no units (b) out of the region within 10 mol % to all units of the molecular chain from each terminal of the molecular chain.

In the method for producing the fluorinated elastic copolymer of the present invention, the amount of formation of each type of units to all units of the fluorinated elastic copolymer can be controlled, for example, by the amount of each monomer component. In such a case, the amount of the monomer component (1) is preferably from 80 to 95 mol %, more preferably from 80 to 90 mol % to the total amount of the monomer component (1) and the monomer component (2). When the amount of the monomer component is within the above range, the amount of formation of each type of units to all units of the obtained fluorinated elastic copolymer is easily controlled to be within a predetermined range.

As the iodine compound having two iodine atoms, a compound represented by the formula (1) is preferred.

$$I-R^{f1}-I \qquad (1)$$

wherein $R^{f1}$ is a $C_{4-12}$ perfluoroalkylene group.

The perfluoroalkylene group in $R^{f1}$ preferably has from 3 to 8 carbon atoms.

As specific examples of the compound, 1,3-diiodoperfluoropropane, 1,4-diiodoperfluorobutane, 1,6-diiodoperfluorohexane and 1,8-diiodoperfluorooctane may be mentioned.

As the above compound, 1,4-diiodoperfluorobutane is preferred.

In the method for producing the fluorinated elastic copolymer of the present invention, the amount of the iodine compound is preferably from 0.01 to 5.0 parts by mass, more preferably from 0.1 to 1.0 parts by mass to 100 parts by mass of the total amount of the monomer component (1) and the monomer component (2).

In the method for producing the fluorinated elastic copolymer of the present invention, it is preferred to initiate polymerization in the presence of a radical polymerization initiator.

The radical polymerization initiator is preferably a water-soluble initiator or a redox initiator. The amount of the radical polymerization initiator is preferably from 0.0001 to 3 parts by mass, more preferably from 0.001 to 1 parts by mass to 100 parts by mass of the total amount of the monomer component (1) and the monomer component (2).

The water-soluble initiator may, for example, be a persulfate (such as ammonium persulfate, sodium persulfate or potassium persulfate) or an organic initiator (such as disuccinic acid peroxide or azobisisobutylamidine dihydrochloride). Among them, a persulfate is preferred, and ammonium persulfate is particularly preferred.

The redox initiator may, for example, be a combination of a reducing agent and the above persulfate.

The reducing agent may, for example, be a thiosulfate, a sulfite, a bisulfite, a pyrosulfite or a hydroxymethanesulfinate. Among them, a hydroxymethanesulfinate is preferred, and sodium hydroxymethanesulfinate is more preferred.

The redox initiator preferably contains a small amount of iron, an iron salt such as ferrous salt, silver sulfate or the like as a third component in addition to the reducing agent and the persulfate. Among iron salts, a water-soluble iron salt is particularly preferred. As specific examples of the water-soluble iron salt, ferrous sulfate, ferric sulfate, ferrous nitrate, ferric nitrate, ferrous chloride, ferric chloride, ammonium iron(II) sulfate or ammonium iron(III) sulfate, and a hydrate thereof, may, for example, be mentioned.

In addition to the redox initiator, it is also preferred to use a chelating agent. As a specific example of a preferred chelating agent, disodium ethylenediaminetetraacetate dihydrate may be mentioned.

The amount of the persulfate is preferably from 0.001 to 3 mass %, more preferably from 0.01 to 1 mass %, further preferably from 0.05 to 0.5 mass % to 100 mass % of the after-described aqueous medium.

The amount of the reducing agent is preferably from 0.001 to 3 mass %, more preferably from 0.01 to 1 mass %, further preferably from 0.05 to 0.5 mass % to 100 mass % of the aqueous medium.

The amount of the third component such as iron, the iron salt such as ferrous salt or silver sulfate is preferably from 0.0001 to 0.3 mass %, more preferably from 0.001 to 0.1 mass %, further preferably from 0.01 to 0.1 mass % to 100 mass % of the aqueous medium.

The amount of the chelating agent is preferably from 0.0001 to 0.3 mass %, more preferably from 0.001 to 0.1 mass %, further preferably from 0.01 to 0.1 mass % to 100 mass % of the aqueous medium.

As the polymerization method, emulsion polymerization method, solution polymerization method, suspension polymerization method or bulk polymerization method may, for example, be mentioned. Among them, preferred is emulsion polymerization method in which the monomer component is copolymerized in the presence of an emulsifier in an aqueous medium, whereby the molecular weight and the copolymer composition are easily adjusted, and the productivity will be excellent.

The aqueous medium is preferably water, or water containing a water-soluble organic solvent, more preferably water containing a water-soluble organic solvent.

The water-soluble organic solvent may, for example, be tert-butanol, propylene glycol, dipropylene glycol, dipropylene glycol monomethyl ether or tripropylene glycol. Among them, tert-butanol, propylene glycol or dipropylene glycol monomethyl ether is preferred, and tert-butanol is more preferred.

The amount of the water-soluble organic solvent is preferably from 1 to 50 parts by mass, more preferably from 3 to 20 parts by mass to 100 parts by mass of water.

pH of the aqueous medium is preferably from 7 to 14, more preferably from 7 to 11, further preferably from 7.5 to 11, particularly preferably from 8 to 10.5. When the pH is lower than 7, stability of the iodine compound may decrease, and the crosslinkability of the obtainable fluorinated elastic copolymer may sometimes decrease.

It is preferred to maintain the pH of the aqueous medium to be within the above range for at least 80%, more preferably at least 90%, further preferably at least 95%, particularly preferably 100% of the whole polymerization period from start of the polymerization until completion of the polymerization.

To adjust the pH, a pH buffer solution is preferably used. The pH buffer solution may, for example, be an inorganic salt. The inorganic salt may, for example, be a phosphate such as disodium hydrogenphosphate or sodium dihydrogen phosphate, or a carbonate such as sodium bicarbonate or sodium carbonate. As specific examples of a preferred phosphate, disodium hydrogenphosphate dihydrate and disodium hydrogenphosphate dodecahydrate may be mentioned.

The emulsifier may, for example, be an anionic emulsifier, a nonionic emulsifier or a cationic emulsifier. Among them, in view of more excellent mechanical and chemical stability of the latex, an anionic emulsifier or a cationic emulsifier is preferred, and an anionic emulsifier is more preferred.

As specific examples of the anionic emulsifier, a hydrocarbon emulsifier such as sodium lauryl sulfate or sodium dodecylbenzene sulfonate, a fluorinated alkanoate such as ammonium perfluorooctanoate or ammonium perfluorohexanoate, and a fluorinated ether carboxylic acid compound such as compound represented by the formula (4) may be mentioned.

$$R^{f4}OR^{f5}COOA \quad (4)$$

wherein $R^{f4}$ is a $C_{1-8}$ perfluoroalkyl group, $R^{f5}$ is a fluorinated alkylene group or a fluorinated alkylene group having an etheric oxygen atom, and A is a hydrogen atom, an alkali metal or $NH_4$. $R^{f5}$ may have a side chain of a $C_{1-3}$ perfluoroalkyl group.

The number of carbon atoms in $R^{f5}$ is preferably from 1 to 12, more preferably from 1 to 8.

The emulsifier is preferably an emulsifier having a fluorine atom, more preferably a fluorinated alkanoate or a fluorinated ether carboxylic acid compound, further preferably compound represented by the formula (5).

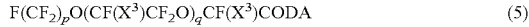

$$F(CF_2)_pO(CF(X^3)CF_2O)_qCF(X^3)CODA \quad (5)$$

wherein $X^3$ is a fluorine atom or a $C_{1-3}$ perfluoroalkyl group, A is a hydrogen atom, an alkali metal or $NH_4$, p is an integer of from 1 to 10, and q is an integer of from 0 to 3.

As specific examples of the compound represented by the formula (4) and the compound represented by the formula (5) wherein A is $NH_4$, the following compounds may be mentioned.

$C_3F_7OCF_2COONH_4$, $C_4F_9OCF_2COONH_4$, $C_5F_{11}OCF_2COONH_4$, $CF_3O(CF_2)_2OCF_2COONH_4$, $C_2F_5O(CF_2)_2OCF_2COONH_4$, $C_2F_5OCF(CF_3)COONH_4$, $C_3F_7OCF(CF_3)COONH_4$, $C_4F_9OCF(CF_3)COONH_4$, $CF_3OCF(CF_3)CF_2OCF(CF_3)COONH_4$, $C_3F_7OCF(CF_3)CF_2OCF(CF_3)COONH_4$, $CF_3O(CF_2)_3OCFHCF_2)COONH_4$, $CF_3O(CF_2)_3OCF_2COONH_4$, $CF_3O(CF_2)_3O(CF_2)_2COONH_4$, $C_2F_5O(CF_2)_2O(CF_2)_2COONH_4$, $CF_3O(CF_2)_3OCF(CF_3)COONH_4$, $C_2F_5O(CF_2)_2OCF(CF_3)COONH_4$ and $CF_3OCF_2OCF_2OCF_2COONH_4$ As preferred specific examples, $C_2F_5O(CF_2OCF_2COONH_4$, $CF_3O(CF_2)_3OCFHCF_2COONH_4$, $CF_3OCF(CF_3)CF_2OCF(CF_3)COONH_4$ and $C_3F_7OCF(CF_3)COONH_4$ may be mentioned.

The amount of the emulsifier is preferably from 0.01 to 15 parts by mass, more preferably from 0.1 to 10 parts by mass, further preferably from 0.1 to 3 parts by mass to 100 parts by mass of the aqueous medium.

By the emulsion polymerization method, a latex containing a fluorinated elastic copolymer is obtained. The fluorinated elastic copolymer may be isolated from the latex by aggregation.

The aggregation method may, for example, be a method of adding a metal salt for salting out, a method of adding an inorganic acid such as hydrochloric acid, a method by mechanical shearing, or a method by freezing and defrosting.

The polymerization conditions may be properly selected depending upon the monomer composition, the decomposition temperature of the radical polymerization initiator, etc.

The polymerization temperature is preferably from 0° C. to 50° C., more preferably from 10° C. to 40° C., further preferably from 20° C. to 30° C. When the polymerization temperature is at most 50° C., the obtainable fluorinated elastic copolymer will be more excellent in crosslinkability. When the polymerization temperature is at least 0° C., the obtainable fluorinated elastic copolymer will be more excellent in crosslinkability, and an obtainable crosslinked product will be more excellent in mechanical properties.

The polymerization pressure is preferably from 1.0 to 10 MPaG, more preferably from 1.5 to 5.0 MPaG, further preferably from 2.0 to 4.0 MPaG. When the polymerization pressure is within a range of from 1.0 to 10 MPaG, the polymerization rate will readily be controlled to an appropriate rate, and the productivity will be excellent.

The polymerization rate is preferably from 10 to 100 g/L·hour, more preferably from 5 to 70 g/L·hour, further preferably from 30 to 50 g/L·hour. When the polymerization rate is at least 10 g/L·hour, practical productivity will be excellent. When the polymerization rate is at most 70 g/L·hour, the molecular weight of the fluorinated elastic copolymer will hardly be decreased, and the crosslinkability will be more excellent.

The polymerization time is preferably from 0.5 to 50 hours, more preferably from 1 to 30 hours, further preferably from 2 to 20 hours.

(Mechanism of Action)

In the above-described method for producing the fluorinated elastic copolymer of the present invention, the monomer (a) and optionally the monomer (c) are copolymerized in the presence of an iodine compound having two iodine atoms until units in an amount of at least 80 mol % to all units of the fluorinated elastic copolymer are formed, and accordingly a fluorinated elastic copolymer excellent in heat resistance and chemical resistance is obtained. Then, in the method for producing the fluorinated elastic copolymer of the present invention, the monomer (a), the monomer (b)

and optionally the monomer (c) are copolymerized until the units based on the monomer (b) in an amount of at least 0.09 mol % to all units of the fluorinated elastic copolymer are formed, and accordingly a fluorinated elastic copolymer excellent in adhesion, processability, mechanical properties, heat resistance and chemical resistance will be obtained.

In the method for producing the fluorinated elastic copolymer of the present invention, a molecular chain having a relatively high molecular weight and a molecular chain having a relatively low molecular weight can be simultaneously produced. The molecular chain of the fluorinated elastic copolymer having a relatively low molecular weight functions as a lubricant, whereby a fluorinated elastic copolymer excellent in processability is obtained.

(Application)

The fluorinated elastic copolymer of the present invention and a fluorinated elastic copolymer obtained by the production method of the present invention may be used as a fluorinated elastic copolymer composition as they are, or may be used as a fluorinated elastic copolymer composition as blended with a crosslinking agent such as an organic peroxide, a crosslinking aid or other additives by a kneading method using a kneading apparatus such as a roll, a kneader, a Bunbury mixer or an extruder.

Particularly, the fluorinated elastic copolymer obtained by the production method of the present invention has a broad molecular weight distribution and is thereby excellent in processability even without adding e.g. a lubricant having a low molecular weight. Accordingly, the fluorinated elastic copolymer obtained by the production method of the present invention may be applied as it is to extrusion or injection molding without adding e.g. a lubricant.

The organic peroxide may, for example, be a dialkyl peroxide (such as di-tert-butyl peroxide, tert-butyl cumyl peroxide, dicumyl peroxide, α,α-bis(tert-butylperoxy)-p-diisopropylbenzene or 2,5-dimethyl-2,5-di(tert-butylperoxy)hexane), 1,1-di(tert-butylperoxy)-3,3,5-trimethylcyclohexane, 2,5-dimethylhexane-2,5-dihydroxy peroxide, benzoyl peroxide, tert-butyl peroxybenzene, 2,5-dimethyl-2,5-di(benzoylperoxy)hexane, tert-butylperoxymaleic acid or tert-butyl peroxypropylcarbonate. Among them, the dialkyl peroxide is preferred.

The amount of the organic peroxide blended is preferably from 0.3 to 10 parts by mass, more preferably from 0.3 to 5 parts by mass, further preferably from 0.5 to 3 parts by mass to 100 parts by mass of the fluorinated elastic copolymer. When the amount of the organic peroxide blended is within the above range, the crosslinking rate will be appropriate, and the balance between tensile strength and elongation of the crosslinked product will be excellent.

The crosslinking aid may, for example, be triallyl cyanurate, triallyl isocyanurate, trimethacryl isocyanurate, 1,3,5-triacryloylhexahydro-1,3,5-triazine, triallyl trimellitate, m-phenylenediaminebismaleimide, p-quinone dioxime, p,p'-dibenzoylquinone dioxime, dipropargyl terephthalate, diallyl phthalate, N,N',N'',N'''-tetraallylterephthalamide, a vinyl group-containing siloxane oligomer (such as polymethylvinylsiloxane or polymethylphenylvinylsiloxane). Among them, triallyl cyanurate, triallyl isocyanurate or trimethallyl isocyanurate is preferred, and triallyl isocyanurate is more preferred.

The amount of the crosslinking aid blended is preferably from 0.1 to 20 parts by mass, more preferably from 1 to 10 parts by mass to 100 parts by mass of the fluorinated elastic copolymer. When the amount of the crosslinking aid is within the above range, the crosslinking rate will be appropriate, and the balance between tensile strength and elongation of the crosslinked product will be excellent.

With the fluorinated elastic copolymer composition, a metal oxide may be blended.

The metal oxide is preferably an oxide of a bivalent metal. As preferred specific examples of the oxide of a bivalent metal, magnesium oxide, calcium oxide, zinc oxide and lead oxide may be mentioned.

The amount of the metal oxide blended is preferably from 0.1 to 10 parts by mass, more preferably from 0.5 to 5 parts by mass to 100 parts by mass of the fluorinated elastic copolymer.

By blending the metal oxide, crosslinkability of the fluorinated elastic copolymer will further improve.

As other additives, a filler, an acid acceptor, a stabilizer, a coloring agent, an antioxidant, a processing aid, a lubricant, a lubricating agent, a flame retardant, an antistatic agent, a pigment, a reinforcing agent and a vulcanization accelerator may, for example, be mentioned. Such other additives may be used in combination of two or more.

With the fluorinated elastic copolymer composition, depending upon the application, a polymer material other than the fluorinated elastic copolymer may be blended. As other polymer material, polytetrafluoroethylene, polyvinylidene fluoride, polyvinyl fluoride, polychlorotrifluoroethylene, a fluororesin such as a bipolymer comprising TFE units and ethylene units (hereinafter referred to as E units), a fluorinated elastomer such as a copolymer having VdF units and HFP units and having no units (b), a copolymer having TFE units and P units and having no units (b), a copolymer having TFE units, HFP units and VdF units and having no units (b), or a copolymer having TFE units and PAVE units and having no units (b), or a hydrocarbon elastomer such as a copolymer having E units, P units and non-conjugated diene units may, for example, be mentioned.

For example, when a fluororesin is blended with the fluorinated elastic copolymer composition, forming property and strength will further improve. Further, when a hydrocarbon elastomer such as a copolymer having E units, P units and non-conjugated diene units is blended with the fluorinated elastic copolymer composition, the crosslinkability will further improve.

The fluorinated elastic copolymer composition may be crosslinked simultaneously with forming e.g. by hot pressing, or may be preliminarily formed and then crosslinked.

The forming method may, for example, be compression molding, injection molding, extrusion, calendering, dipping or coating.

As the crosslinking conditions, considering the forming method and the shape of the crosslinked product, various conditions such as hot pressing crosslinking, steam crosslinking, hot air crosslinking or lead encasing crosslinking may be employed. The crosslinking temperature may, for example, be from 100 to 400° C. The crosslinking time may, for example, be from several seconds to 24 hours.

Secondary crosslinking may be conducted for the purpose of improving mechanical properties and compression set of the crosslinked product and stabilizing other properties. The crosslinking temperature for secondary crosslinking may, for example, be from 100 to 300° C. The crosslinking time for secondary crosslinking may, for example, be from 30 minutes to 48 hours.

It is also preferred to crosslink the formed fluorinated elastic copolymer composition by irradiation with radioactive rays. The radioactive rays applied may, for example, be electron beams or ultraviolet rays. The amount of irradiation in electron beam irradiation is preferably from 0.1 to 30 Mrad, more preferably from 1 to 20 Mrad.

As described above, the fluorinated elastic copolymer of the present invention is excellent in adhesion. Accordingly, the fluorinated elastic copolymer of the present invention is suitably used to produce a structure having the fluorinated elastic copolymer or a crosslinked product of the fluorinated elastic copolymer composition and a metal or a resin bonded. In such a structure, the crosslinked product of the fluorinated elastic copolymer of the present invention and the metal or the resin are favorably bonded.

EXAMPLES

Now, the present invention will be described in further detail with reference to Examples. However, it should be understood that the present invention is by no means restricted to the following specific Examples. Ex. 1 to 4 are Examples of the present invention, and Ex. 5 to 8 are Comparative Examples.

<Abbreviations>

C4DI: 1,4-diiodoperfluorobutane

Rongalit: a 2.5 mass % aqueous solution of sodium hydroxymethanesulfinate dihydrate adjusted to pH 10.0 with sodium hydroxide.

SUS: stainless steel film (SUS304).

PI: polyimide film.

<Measurement method)

(Copolymer Composition)

The proportions (mol %) of the units constituting the fluorinated elastic copolymer were obtained by $^1$H and $^{19}$F-nuclear magnetic resonance (NMR) analysis. (Iodine atom content)

The iodine content of the fluorinated elastic copolymer was quantitatively determined by an apparatus which is a combination of automatic quick furnace combustion apparatus (AQF-100, manufactured by Dia Instruments Co., Ltd.) and ion chromatography.

(Elastic Shear Modulus G')

The torque was measured in accordance with ASTM D6204 by Rubber Process Analyzer (RPA2000, manufactured by ALPHA TECHNOLOGIES) under conditions of a sample amount of 7.5 g, a temperature of 100° C. and an amplitude of 0.5° by changing the frequency from 1 to 2,000 cpm, and the torque at 50 cpm was taken as the elastic shear modulus G' of the fluorinated elastic copolymer.

(Terminal Structure of Molecular Chain of Fluorinated Elastic Copolymer)

The fluorinated elastic copolymer was heat-decomposed at 600° C. by means of Double-Shot Pyrolyzer (PY-2020iD, manufactured by Frontier Laboratories Ltd.), followed by analysis by means of EI+ ionization method by gas chromatography/Time-of-Flight Mass Spectrometer (hereinafter referred to as GC/TOFMS) (7890A, manufactured by Agilent, and JMS-T100GC, manufactured by JEOL Ltd.) to detect a structure bonded to an iodine atom at the terminal.

<Evaluation Method>

(Adhesion)

5 g of the fluorinated elastic copolymer was sandwiched between two sheets of SUS or PI, followed by hot pressing under a pressure of 10 MPa at a temperature of 170° C. for 5 minutes to bond a crosslinked product of the fluorinated elastic copolymer and the metal or the resin to obtain a structure. The structure was cooled to room temperature (25° C.) and subjected to manual peel test with hands.

From the results of the peel test, the adhesion of the structure was evaluated based on standards ○: no peeling occurred at the interface between the crosslinked product and the metal or the resin, and the whole crosslinked product underwent material failure, Δ: a part of the crosslinked product underwent material failure, and ×: peeling occurred at the interface.

<Production of Fluorinated Elastic Copolymer>

(Ex. 1)

The interior of a stainless steel pressure resistant reactor having an internal capacity of 3,200 mL equipped with a stirring anchor blade was deaerated, and then 1,500 g of deionized water, 60 g of disodium hydrogenphosphate dodecahydrate, 0.9 g of sodium hydroxide, 198 g of tert-butanol, 8.9 g of sodium lauryl sulfate and 3.8 g of ammonium persulfate were added to the reactor. Further, an aqueous solution having 0.4 g of disodium ethylenediaminetetraacetate dihydrate and 0.3 g of ferrous sulfate heptahydrate dissolved in 200 g of deionized water was added to the reactor. The pH of the aqueous medium in the reactor was 9.5.

Then, a monomer mixture gas of TFE/P=88/12 (molar ratio) was injected at 25° C. so that the pressure in the reactor would be 2.47 MPaG. The anchor blade was rotated at 300 rpm, and 4.0 g of C4DI was added. Then, Rongalit was added to the reactor to initiate the polymerization reaction. After the polymerization reaction started, Rongalit was continuously added to the reactor by a high pressure pump.

At a point when the amount of the TFE/P monomer mixture gas injected reached 400 g, addition of Rongalit was terminated, and 12.4 mL of AGE was injected to the reactor by nitrogen back pressure. At a point when the total amount of the TFE/P monomer mixture gas injected reached 500 g, the internal temperature of the reactor was cooled to 10° C. to terminate the polymerization reaction to obtain a latex. The amount of Rongalit added from initiation of the polymerization to termination of the polymerization was 40 g. The polymerization time was 5 hours.

To the obtained latex, a 5 mass % aqueous solution of calcium chloride was added to aggregate the latex thereby to precipitate fluorinated elastic copolymer in Ex. 1. The precipitated fluorinated elastic copolymer in Ex. 1 was collected by filtration, washed with deionized water and dried in an oven at 100° C. for 15 hours to obtain 500 g of white fluorinated elastic copolymer in Ex. 1. The copolymer composition of the fluorinated elastic copolymer in Ex. 1 was TFE units/P units/AGE units=56/44/0.4 (molar ratio).

(Ex. 2)

Monomers were polymerized in the same manner as in Ex. 1 except that the amount of AGE injected was 37.2 mL to obtain a latex containing fluorinated elastic copolymer in Ex. 2. In Ex. 2, at a point when the total amount of the TFE/P monomer mixture gas injected reached 420 g, the polymerization reaction was terminated. The amount of Rongalit added from initiation of the polymerization to termination of the polymerization was 39 g. The polymerization time was 4.5 hours.

In the same manner as in Ex. 1, the fluorinated elastic copolymer in Ex. 2 was recovered from the latex, washed and dried to obtain 420 g of white fluorinated elastic copolymer in Ex. 2. The copolymer composition of the fluorinated elastic copolymer in Ex. 2 was TFE units/P units/AGE units=56/44/0.5 (molar ratio).

(Ex. 3)

Monomers were polymerized in the same manner as in Ex. 1 except that the monomer (b) injected was 18.8 mL of GO-BVE to obtain a latex containing fluorinated elastic copolymer in Ex. 3. The amount of Rongalit added from initiation of the polymerization to termination of the polymerization was 39 g. The polymerization time was 5 hours.

In the same manner as in Ex. 1, the fluorinated elastic copolymer in Ex. 3 was recovered from the latex, washed and dried to obtain 500 g of pale yellow fluorinated elastic copolymer in Ex. 3. The copolymer composition of the fluorinated elastic copolymer in Ex. 3 was TFE units/P units/GO-BVE units=56/44/0.5 (molar ratio).

(Ex. 4)

Monomers were polymerized in the same manner as in Ex. 1 except that the monomer (b) injected was 13.2 mL of HBVE to obtain a latex containing fluorinated elastic copolymer in Ex. 4. The amount of Rongalit added from initiation of the polymerization to termination of the polymerization was 39 g. The polymerization time was 6 hours.

In the same manner as in Ex. 1, the fluorinated elastic copolymer in Ex. 4 was recovered from the latex, washed and dried to obtain 482 g of pale yellow fluorinated elastic copolymer in Ex. 4. The copolymer composition of the fluorinated elastic copolymer in Ex. 4 was TFE units/P units/HBVE units=56/44/0.6 (molar ratio).

(Ex. 5)

Monomers were polymerized in the same manner as in Ex. 1 except that AGE was not added, to obtain a latex containing fluorinated elastic copolymer in Ex. 5. The amount of Rongalit added from initiation of the polymerization to termination of the polymerization was 40 g. The polymerization time was about 5.5 hours.

In the same manner as in Ex. 1, the fluorinated elastic copolymer in Ex. 5 was recovered from the latex, washed and dried to obtain 477 g of white fluorinated elastic copolymer in Ex. 5. The copolymer composition of the fluorinated elastic copolymer in Ex. 5 was TFE units/P units=56/44 (molar ratio).

(Ex. 6)

Monomers were polymerized in the same manner as in Ex. 1 except that the amount of AGE injected was 4.0 mL to obtain a latex containing fluorinated elastic copolymer in Ex. 6. The amount of Rongalit added from initiation of the polymerization to termination of the polymerization was 41 g. The polymerization time was about 5.5 hours.

In the same manner as in Ex. 1, the fluorinated elastic copolymer in Ex. 6 was recovered from the latex, washed and dried to obtain 518 g of white fluorinated elastic copolymer in Ex. 6. The copolymer composition of the fluorinated elastic copolymer in Ex. 6 was TFE units/P units/AGE units=56/44/0.08 (molar ratio).

(Ex. 7)

Monomers were polymerized in the same manner as in Ex. 1 except that C4DI was not added, to obtain a latex containing fluorinated elastic copolymer in Ex. 7. The amount of Rongalit added from initiation of the polymerization to termination of the polymerization was 42 g. The polymerization time was about 6 hours.

In the same manner as in Ex. 1, the fluorinated elastic copolymer in Ex. 7 was recovered from the latex, washed and dried to obtain 410 g of white fluorinated elastic copolymer in Ex. 7.

(Ex. 8)

Monomers were polymerized in the same manner as in Ex. 1 except that C4DI was not added, and 12.4 mL of AGE to be injected was divided into four, and 3.1 mL of AGE was intermittently added every 100 g of the TFE/P monomer mixture gas injected, to obtain a latex containing fluorinated elastic copolymer in Ex. 8. The amount of Rongalit added from initiation of the polymerization to termination of the polymerization was 40 g. The polymerization time was about 6 hours.

In the same manner as in Ex. 1, the fluorinated elastic copolymer in Ex. 8 was recovered from the latex, washed and dried to obtain 428 g of white fluorinated elastic copolymer in Ex. 8.

<Analysis and Evaluation of Fluorinated Elastic Copolymer>

With respect to the fluorinated elastic copolymers in Ex. 1 to 6, whether or not the units (b) were contained was analyzed by NMR. The fluorinated elastic copolymers in Ex. 7 and 8 had low solubility and were thereby not analyzed by NMR.

The fluorinated elastic copolymers in Ex. 1 to 4 and 6 were confirmed to have the units (b), since a peak assigned to a carbon-oxygen bond was confirmed in NMR spectra of the fluorinated elastic copolymers in Ex. 1 to 4 and 6.

Further, the structure of the terminal of the fluorinated elastic copolymers in Ex. 1 to 8 was analyzed by pyrolysis gas chromatography.

The fluorinated elastic copolymers in Ex. 1, 2 and 6 were confirmed to have an iodine atom bonded to the terminal of a molecular chain and have an AGE unit adjacent to the iodine atom.

The fluorinated elastic copolymer in Ex. 3 was confirmed to have an iodine atom bonded to the terminal of a molecular chain and have a GO-BVE unit adjacent to the iodine atom.

The fluorinated elastic copolymer in Ex. 4 was confirmed to have an iodine atom bonded to the terminal of a molecular chain and have a HBVE unit adjacent to the iodine atom.

The fluorinated elastic copolymer in Ex. 5 was confirmed to have an iodine atom bonded to the terminal of a molecular chain but have no unit (b).

The fluorinated elastic copolymers in Ex. 7 and 8 were confirmed to have no iodine atom bonded to the terminal of a molecular chain, since no iodine material was added.

The fluorinated elastic copolymer in Ex. 5 was dissolved in THF and subjected to measurement of the mass average molecular weight as calculated as polystyrene by means of gel permeation chromatography (GPC), whereupon it was 150,000.

With respect to the fluorinated elastic copolymers in Ex. 1 to 4 and 6 to 8, the solubility in THF was different from the solubility of the fluorinated elastic copolymer in Ex. 5 in THF, and the measurement under the same conditions was not conducted.

However, as described above, the elastic shear modulus G' is an index of the molecular weight and the flowability, and a high elastic shear modulus G' means a high molecular weight and a low flowability. As described hereinafter, the elastic shear moduli G' of the fluorinated elastic copolymers in Ex. 1 to 4 and 6 were close to the elastic shear modulus G' of the fluorinated elastic copolymer in Ex. 5, and accordingly it is estimated that the mass average molecular weights of the fluorinated elastic copolymers in Ex. 1 to 4 and 6 are close to that of the fluorinated elastic copolymer in Ex. 5.

With respect to crosslinked products of the fluorinated elastic copolymers in Ex. 1 to 8, the density and the elastic shear modulus G' were measured, and adhesion to SUS or PI was evaluated. The results are shown in Table 1.

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Monomer (b) | AGE | AGE | GO-BVE | HBVE | — | AGE | AGE | AGE |
| Amount of monomer (b) charged [mmol] | 105 | 316 | 106 | 110 | — | 34 | 105 | 105 |
| Amount of C4DI charged [mmol] | 8.8 | 8.8 | 8.8 | 8.8 | 8.8 | 8.8 | 0.0 | 0.0 |
| Proportion of units (b) to all units in fluorinated elastic copolymer [mol %] | 0.4 | 0.5 | 0.5 | 0.6 | — | Less than 0.09 | — | — |
| Content of iodine atoms to 100 mass % of fluorinated elastic copolymer [mass %] | 0.4 | 0.5 | 0.4 | 0.4 | 0.4 | — | 0.0 | 0.0 |
| Elastic shear modulus G' [kPa] | 206 | 163 | 202 | 207 | 235 | 266 | 521 | 470 |
| Adhesion to SUS | ○ | ○ | ○ | ○ | X | Δ | X | X |
| Adhesion to PI | ○ | ○ | ○ | ○ | X | X | X | X |

The fluorinated elastic copolymers in Ex. 1 to 4, which had an iodine atom bonded to the terminal of the molecular chain and a unit (b) adjacent to the iodine atom and which had a proportion of the units (b) of from 0.09 to 2.0 mol %, was excellent in adhesion, heat resistance and chemical resistance.

In Ex. 1 to 4, the monomer (a), the monomer (b) and the monomer (c) were copolymerized after units in an amount of at least 80 mol % to all units of the fluorinated elastic copolymer were formed, and accordingly the obtainable fluorinated elastic copolymer was excellent in processability and mechanical properties.

The fluorinated elastic copolymer in Ex. 5, which had no units (b), was inferior in adhesion.

The fluorinated elastic copolymer in Ex. 6, which had a proportion of the units (b) of less than 0.09 mol %, was inferior in the adhesion.

The fluorinated elastic copolymers in Ex. 7 and 8 were inferior in the adhesion. Further, since no C4DI was added, the molecular weight could not be controlled, and flowability of the fluorinated elastic copolymer was low.

INDUSTRIAL APPLICABILITY

The fluorinated elastic copolymer of the present invention and a fluorinated elastic copolymer obtained by the production method of the present invention are suitable for materials such as a composite sealing material, an O-ring, a sheet, a gasket, an oil seal, a diaphragm and a V-ring. Further, they are applicable to a heat resistant chemical resistant sealing material, a heat resistant oil resistant sealing material, an electric wire coating material, a sealing material for a semiconductor device, a corrosion resistant rubber coating material, and a sealing material for a urea resistant grease.

This application is a continuation of PCT Application No. PCT/JP2018/044285, filed on Nov. 30, 2018, which is based upon and claims the benefit of priority from Japanese Patent Application No. 2017-234569 filed on Dec. 6, 2017. The contents of those applications are incorporated herein by reference in their entireties.

What is claimed is:

1. A fluorinated elastic copolymer having units based on the following monomer (a), units based on the following monomer (b) and optionally units based on the following monomer (c), which has an iodine atom bonded to a terminal of a molecular chain of the fluorinated elastic copolymer, and the unit based on the monomer (b) adjacent to the iodine atom, and which has a proportion of the units based on the monomer (b) of from 0.09 to 2.0 mol % to all units of the fluorinated elastic copolymer:

monomer (a): a monomer selected from the group consisting of tetrafluoroethylene, hexafluoropropylene, vinylidene fluoride, chlorotrifluoroethylene, a perfluoro(alkyl vinyl ether) and 2,3,3,3-tetrafluoropropene;

monomer (b): a monomer having at least one adhesive functional group selected from the group consisting of an epoxy group and a hydroxy group, and having one polymerizable carbon-carbon double bond;

monomer (c): a monomer selected from the group consisting of ethylene and propylene.

2. The fluorinated elastic copolymer according to claim 1, which is a copolymer selected from the group consisting of a copolymer having units based on tetrafluoroethylene, units based on propylene and units based on the monomer (b), a copolymer having units based on tetrafluoroethylene, units based on a perfluoro(alkyl vinyl ether) and units based on the monomer (b), a copolymer having units based on vinylidene fluoride, units based on hexafluoropropylene and units based on the monomer (b), a copolymer having units based on tetrafluoroethylene, units based on vinylidene fluoride, units based on hexafluoropropylene and units based on the monomer (b), and a copolymer having units based on vinylidene fluoride, units based on tetrafluoroethylene, units based on a perfluoro(alkyl vinyl ether) and units based on the monomer (b).

3. The fluorinated elastic copolymer according to claim 1, wherein the monomer (b) is a monomer selected from the group consisting of allyl glycidyl ether, vinyl glycidyl ether, 4-glycidyl oxybutyl vinyl ether and 4-hydroxybutyl vinyl ether.

4. The fluorinated elastic copolymer according to claim 1, wherein a proportion of the units based on the monomer (a) is from 30 to 98 mol % to the total amount of all units of the fluorinated elastic copolymer.

5. The fluorinated elastic copolymer according to claim 1, which has the units based on the monomer (c).

6. The fluorinated elastic copolymer according to claim 5, wherein the total proportion of the units based on the monomer (a) and the units based on the monomer (c) is from 50 to 99.91 mol % to the total amount of all units of the fluorinated elastic copolymer.

7. The fluorinated elastic copolymer according to claim 5, wherein the proportion of the units based on the monomer (c) is from 1 to 70 mol % to the total amount of the units based on the monomer (a) and the units based on the monomer (c).

8. The fluorinated elastic copolymer according to claim 1, which has a mass average molecular weight of from 10,000 to 2,000,000.

9. A method for producing a fluorinated elastic copolymer having units based on the following monomer (a), units based on the following monomer (b) and optionally units based on the following monomer (c), which comprises
polymerizing a monomer component comprising the monomer (a) and optionally the monomer (c) and not including the monomer (b), in the presence of an iodine compound having two iodine atoms until units in an amount of at least 80 mol % to all units of the fluorinated elastic copolymer are formed, and
copolymerizing monomer components comprising the monomer (a), the monomer (b) and optionally the monomer (c) until the units based on the monomer (b) in an amount of from 0.09 to 2.0 mol % to all units of the fluorinated elastic copolymer are formed:
monomer (a): a monomer selected from the group consisting of tetrafluoroethylene, hexafluoropropylene, vinylidene fluoride, chlorotrifluoroethylene, a perfluoro(alkyl vinyl ether) and 2,3,3,3-tetrafluoropropene;
monomer (b): a monomer having at least one adhesive functional group selected from the group consisting of an epoxy group and a hydroxy group, and having one polymerizable carbon-carbon double bond;
monomer (c): a monomer selected from the group consisting of ethylene and propylene.

10. The production method according to claim 9, wherein the iodine compound is a compound represented by the following formula (1):

$$I\text{—}R^{f1}\text{—}I \qquad (1)$$

wherein $R^{f1}$ is a $C_{4\text{-}12}$ perfluoroalkylene group.

11. The production method according to claim 9, wherein the monomer (a) and optionally the monomer (c) are polymerized in the presence of an emulsifier.

\* \* \* \* \*